(12) United States Patent
Kuczynski et al.

(10) Patent No.: US 6,244,638 B1
(45) Date of Patent: *Jun. 12, 2001

(54) ENERGY MANAGEMENT DEVICE

(75) Inventors: Edward T. Kuczynski, Troy; Michael J. Cicone, Orchard Lake, both of MI (US)

(73) Assignee: Woodbridge Foam Corporation (CA)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

This patent is subject to a terminal disclaimer.

(21) Appl. No.: 09/013,041

(22) Filed: Jan. 26, 1998

(51) Int. Cl.[7] .................................................. B60R 19/22
(52) U.S. Cl. ..................... 293/109; 188/377; 280/751; 293/136
(58) Field of Search .................................. 293/120, 121, 293/136, 107–109, 122, 133; 188/371, 372, 377; 280/751, 752; 206/521.9, 523.5; 428/117; 52/309.7

(56) References Cited

U.S. PATENT DOCUMENTS

| | | | |
|---|---|---|---|
| 3,519,523 | * | 7/1970 | Rodman et al. ............... 52/309.7 X |
| 3,744,835 | * | 7/1973 | Carbone et al. .................... 293/120 |
| 3,809,420 | * | 5/1974 | Weller ............................. 293/121 |
| 3,852,150 | * | 12/1974 | Weller ............................. 293/120 |
| 4,186,915 | * | 2/1980 | Zeller et al. ...................... 293/122 |
| 4,320,913 | * | 3/1982 | Kuroda ............................ 293/120 |
| 4,903,446 | * | 2/1990 | Richards et al. ............... 52/309.7 X |
| 5,141,273 | * | 8/1992 | Freeman ........................... 293/122 |
| 5,660,426 | * | 8/1997 | Sugimori et al. ................... 280/751 |
| 5,803,532 | * | 9/1998 | Karuppaswamy .................. 280/751 |

FOREIGN PATENT DOCUMENTS

| | | | | |
|---|---|---|---|---|
| 451658 | * | 10/1991 | (EP) | ................................... 293/108 |
| 467193 | * | 1/1992 | (EP) | ................................... 293/108 |
| 0030642 | * | 2/1982 | (JP) | ................................... 293/120 |
| 1275023 | * | 11/1989 | (JP) | ................................... 293/109 |

* cited by examiner

*Primary Examiner*—Dennis H. Pedder
(74) *Attorney, Agent, or Firm*—Katten Muchin Zavis

(57) ABSTRACT

An improved energy management device comprises a substrate body and at least one permeable insert sheet disposed in the substrate body. The shape and orientation of the sheet may be varied. In the various embodiments, the insert sheet has a wall substantially transverse to the energy absorbing surface of the energy management device. The substrate body and the at least one energy absorbing insert sheet are engaged with respect to one another. This may be achieved by having at least a portion of the substrate body disposed in the permeable portion of the insert sheet thereby "locking" in place the insert sheet. It has been discovered that such a combination of a substrate body and an insert sheet surprisingly and unexpected results in improved energy management properties when compared to the independent energy management properties of the substrate body and the insert sheet. The energy management device is useful, for example, in the construction of a vehicular bumper.

41 Claims, 3 Drawing Sheets

ENERGY MANAGEMENT DEVICE

BACKGROUND OF THE INVENTION

1. Field of the Invention

The present invention relates to an energy management device. More particularly, the present invention relates to an energy management device useful, inter alia, as a vehicular bumper.

2. Description of the Prior Art

Energy management devices (also known as energy absorbing devices) are known. Such devices can take one of a variety of shapes and forms. Currently, one of the major applications for energy absorbing panels is in use in vehicles, particularly automobiles. Such panels, when used in vehicles, would be of great convenience if they could be included in or substituted for a conventional vehicular bumper.

Conventionally, vehicular bumpers have been constructed with a fascia covering a rigid beam which was connected to the vehicle by two or more suitable rails. During the evolution of vehicular bumpers, it has become conventional to improve energy absorption of the bumper by the use a hydraulic rails. It is also known to construct vehicular bumpers to include one or more fluid containing bladders to improve the energy absorbing capability of the bumper.

As early as the 1960's, it was known to employ a foam energy absorber to cover the rigid beam. The original foam energy absorber included a rigid, high density polyurethane foam. As improvements in vehicular fuel efficiency became desirable, the foam energy absorber was replaced with relatively low density expanded polypropylene foam. Vehicular bumpers comprising foam energy absorbers constructed of semi-rigid, relatively low density expanded polypropylene foam are currently in commercial production.

As is known in the art, most jurisdictions require that vehicular bumpers meet and pass a variety of tests. While the precise tests are jurisdiction-specific, the requirement of having the bumper meet and pass the tests is virtually universal. In the United States all vehicular bumpers are required to meet and pass the standard prescribed by 49 C.F.R. Part 581, including the Preamble to Part 581 (Pre 1–56, inclusive), the contents of which are hereby incorporated by reference. This standard, inter alia, serves to limit damage to vehicular bumpers and other vehicle surfaces in low-speed crashes and impacts.

The art is continually in need of energy management devices useful, for example, in vehicular bumpers, which meet and pass the standard set out in 49 C.F.R. Part 581, and possess improved energy absorbing properties. Enhanced energy management properties of the bumper may be useful in effecting the crash pulse of the vehicle and reducing the forces impacting the occupant interior compartment. Such energy management devices have the potential to contribute to satisfying the European Frontal Impact Test (Off-Set) relating to Directive 96/79/EC of the European Parliament and of the Council of Dec. 16, 1996, the contents of which are hereby incorporated by reference. The European Frontal Impact Test, which requires 56 kph vehicular impact into a deformable barrier off-set by 40% is being implemented for the purposes of occupant protection.

SUMMARY OF THE INVENTION

It is an object of the present invention to provide a novel energy management device having improved energy management properties.

It is another object of the present invention to provide a novel vehicular absorbing device having improved energy management properties.

Accordingly, in one of its aspects, the present invention provides an energy management device having an energy absorbing surface, the energy management device comprising a substrate body and at least one permeable insert sheet disposed in the substrate body, the at least one permeable insert sheet having a wall substantially transverse to the energy absorbing surface, the substrate body and the at least one permeable insert sheet being engaged with respect to one another.

In another of its aspects, the present invention provides a vehicular bumper having an energy absorbing surface, the energy management device comprising a substrate body and at least one permeable insert sheet disposed in the substrate body, the at least one permeable insert sheet having a wall substantially transverse to the energy absorbing surface, the substrate body and the at least one permeable insert sheet being engaged with respect to one another.

Thus, an improved energy management device has been discovered. The energy management device comprises a substrate body and at least one permeable insert sheet disposed in the substrate body. As will be developed hereinbelow, the shape and orientation of the sheet may be varied without departing from the spirit and scope of the invention. In these various embodiments, the insert sheet has a wall substantially to the energy absorbing surface of the energy management device. The substrate body and the at least one insert sheet are engaged with respect to one another. This may be achieved by having at least a portion of the substrate body disposed in the permeable portion of the insert sheet thereby "locking" in place the insert sheet. It has been discovered that such a combination of a substrate body and an insert sheet surprisingly and unexpected results in improved energy absorbing properties when compared to the independent energy absorbing properties of the substrate body and the insert sheet.

BRIEF DESCRIPTION OF THE DRAWINGS

Embodiments of the present invention will be described with reference to the accompanying drawings, in which.

DETAILED DESCRIPTION OF THE PREFERRED EMBODIMENTS

Figure 1:
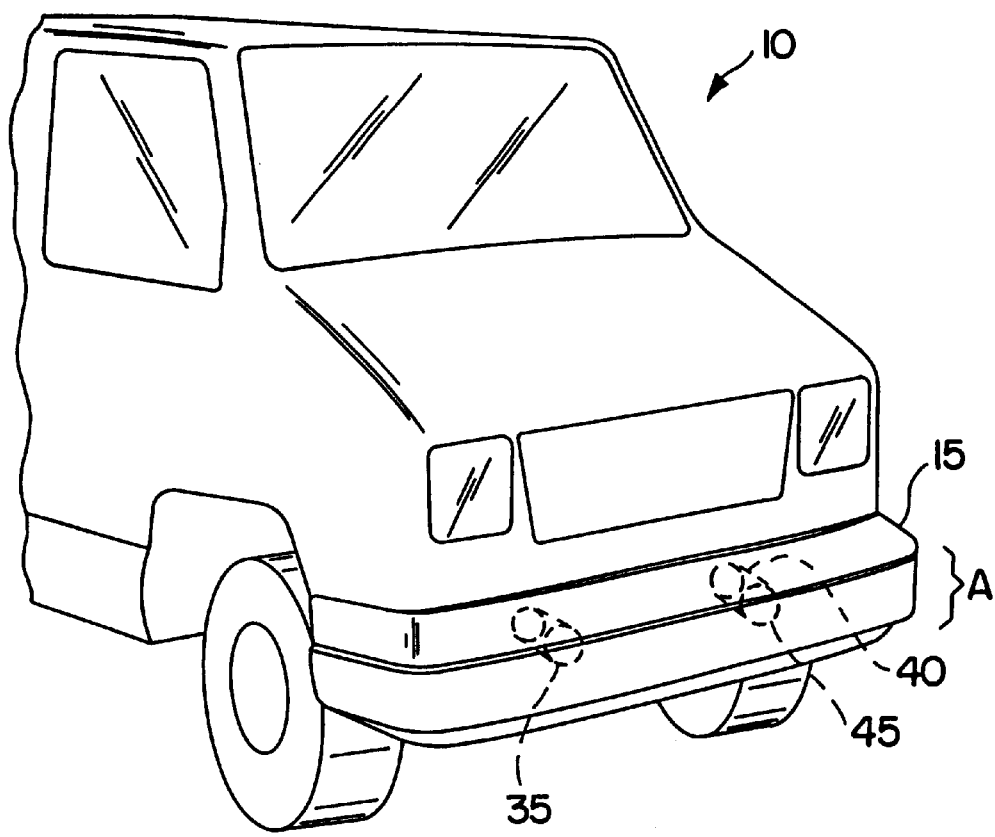
FIG. 1 is a perspective view of a vehicle incorporating a vehicular bumper falling within the scope of the present energy management device.

The present energy management device comprises a substrate body and at least one permeable insert sheet.

The nature of the substrate body is not particularly restricted.

In one embodiment, the substrate body is constructed of a non-foam material. For example, the non-foam material can be an elastomer, preferably an isocyanate-based elastomer such as a polyurethane elastomer.

In another embodiment, the substrate body is constructed of a foam material, preferably a polymer foam material.

Non-limiting examples of suitable polymer foams may be selected from the group consisting of expanded polypropylene foam, foamed isocyanate-based polymer and mixtures thereof. As used throughout this specification, the term "foamed isocyanate-based polymer" is intended to mean, inter alia, a foam selected from the group consisting of polyurethane foam, polyurea foam, polyisocyanurate foam, urea-modified polyurethane foam, urethane-modified polyurea foam, urethane-modified polyisocyanurate foam and urea-modified polyisocyanurate foam. As is known in the art, the term "modified", when used in conjunction with a polyurethane, polyurea or polyisocyanurate means that up to 50% of the polymer backbone forming linkages have been substituted.

The preferred foam material for use in the substrate body is polyurethane foam.

Further, the preferred foam material has an indentation force deflection at 25% deflection in the range of from about 150 to about 40000 pounds, more preferably from about 1000 to about 25000, most preferably from about 2500 to about 10000, when measured pursuant to ASTM 3574-$B_1$.

If the substrate body is constructed of polyurethane foam, it is preferred to utilize the following formulation:

| Component | Amount |
| --- | --- |
| Polymer Polyol | 20–90 parts |
| Polyol | 80–20 parts |
| Crosslinker | 0–25 parts/100 parts total polyol |
| Catalyst | 0.1–1.2 parts/100 parts total polyol |
| Silicone Surfactants | 0–1.1 parts/100 parts total polyol |
| $H_2O$ | 0.2 to 3.5 parts/100 parts total polyol |
| Isocyanate | Adequate quantity for an index of from about 0.80 to 1.10 ratio of NCO equivalents to the equivalents of NCO reactive sites. |

More, preferably, the substrate body is constructed of polyurethane foam produced utilizing the following formulation:

| Component | Amount |
| --- | --- |
| Polymer Polyol | 40–90 parts |
| Polyol | 60–20 parts |
| Crosslinker | 0–20 parts/100 parts total polyol |
| Catalyst | 0.2–1.0 parts/100 parts total polyol |
| Silicone Surfactants | 0–1.1 parts/100 parts total polyol |
| $H_2O$ | 1.0 to 3.0 parts/100 parts total polyol |
| Isocyanate | Adequate quantity for an index of from about 0.80 to 1.10 ratio of NCO equivalents to the equivalents of NCO reactive sites. |

An example of a formulation suitable for use in construction of the substrate body is commercially available from Woodbridge Foam Corporation under the trademark Enerflex 180. As is known in the art, the above preferred formulations for producing the substrate body may be adjusted within the stated ranges to adjust the indentation force deflection thereof.

Suitable polymer polyols, polyols and isocyanates are described in U.S. Pat. Nos. 3,304,273, 3,383,351, 3,523,093, 3,939,106 and 4,134,610, Belgian patent 788,115, Canadian Patent 785,835 and "Polymer/Polyols, a New Class of Polyurethane Intermediate", Kuryla, W. C. et al., J. Cellular Plastics, March (1966), the contents of which are hereby incorporated by reference. Suitable crosslinkers, catalysts and silicone surfactants are described in U.S. Pat. Nos. 4,107,106 and 4,190,712, the contents of which are hereby incorporated herein by reference. See also "Flexible Polyurethane Foams" by Herrington et al. (1991) and the various references cited therein, the contents of which are hereby incorporated by reference.

The insert sheet used in the present energy management device is permeable (i.e., to air, water, etc.). As used throughout this specification, the term "permeable", when used in the context of the insert sheet is intended to describe a physical property of the sheet and not necessarily the chemical constitution of the sheet. Thus, broadly, the insert useful in the present energy management device may be any permeable sheet material. The insert may be flexible or non-flexible. Further, the insert may be fibrous or non-fibrous.

Non-limiting examples of fibrous insert sheets include at least one member selected from the group consisting of glass fibres (e.g., in the form of a cloth or a mat, chopped or unchopped, such as Nico™ 754 1 oz/$ft^2$), polyester fibres, polyolefin fibres (e.g., polyethylene and polypropylene), Kevlar™ fibres, polyamides fibres (e.g., nylon), cellulose fibres (e.g., burlap), carbon fibres, cloth materials such spun bound polyesters (e.g., Lutravil™ 1DH7210B/LDVT222 and Freudenberg™ PTLD585G/PTLD600B), paper (e.g. Kraft #60) and mixtures thereof Further, it will be appreciated that the fibrous insert sheet may be woven or non-woven.

Non-limiting examples of a non-fibrous insert sheets comprise at least one member selected from the group consisting essentially of thermosets (e.g., polyurethanes, polyesters and epoxies), metals such as aluminum foil, polycarbonates (e.g., Lexan™ and Dow Calibre™), polycarbonate/ABS alloys (e.g., Dow Pulse™), ABS terpolymers (e.g., Royalite™ 59 and Dow Magnum™), polyester terphthalate (PET), vinyl, styrene maleic anhydride (e.g., Arco Dylark™), and fibreglass reinforced polypropylene (e.g., Azdel™).

Further, it will be appreciated that many non-fibrous inserts may themselves be reinforced with fibrous materials and thus, the permeable insert sheet may be a combination of fibrous and non-fibrous materials, either mixed or composite in construction. For example, it is possible to preform the insert sheet by reinforcing a fiberglass sheet with polyester, epoxy or other suitable resin. The preformed insert sheet may then be used in the mold used to produce the substrate as discussed hereinbelow. In this embodiment, the substrate body bonds or adheres to the preformed insert sheet.

When the substrate body is constructed of a non-foam material, the nature thereof is not particularly restricted. For example, the substrate body may be a polyurethane elastomer, an epoxy, a resin and the like, which can be dispensed in a suitable mold in which has been placed the insert sheet. If desirable, the non-foam substrate body may be judicially cored to reduce its weight while reducing or eliminating any function penalty.

When the substrate body is constructed of polyurethane foam, it is preferred to produce the present energy management device by initially placing the permeable insert sheet(s) in a suitable mold. Thereafter, a liquid foamable formulation (as discussed hereinabove) may be dispensed in the mold have a mold cavity in the shape of the energy management device. The liquid foamable formulation then expands to fill the mold cavity and the finished device may be demolded. During expansion, the liquid foam formulation enters the voids in the permeable insert sheet causing densification of the formulation adjacent the insert sheet. Such densification is desirable since it serves to improve the energy management properties of the device. Typically, the mold is a clam shell mold comprising a lid and a bowl. Preferably, the permeable insert sheet(s) is (are) placed in the bowl of the mold. In certain cases, it is possible and even desirable to place and secure (using any suitable means such as pins, clamps and the like) the permeable insert sheet(s) in the lid of the mold.

As discussed hereinabove, it is possible to construct the substrate of a polymeric foam such as polypropylene (also known as expanded polypropylene or EPP). Generally, in this embodiment, the process to produce the present energy management device involves use of polypropylene beads which have been impregnated with a suitable blowing agent (hydrocarbon or halohydrocarbon). The beads are placed in a mold and heated, which results in volatilization of the blowing agent and expansion of the beads in a manner whereby adjacent expanded beads are bonded together. It is preferred initially to place the permeable insert sheet in a suitable mold, together with other polypropylene beads, for production of the energy management device.

Figure 2:
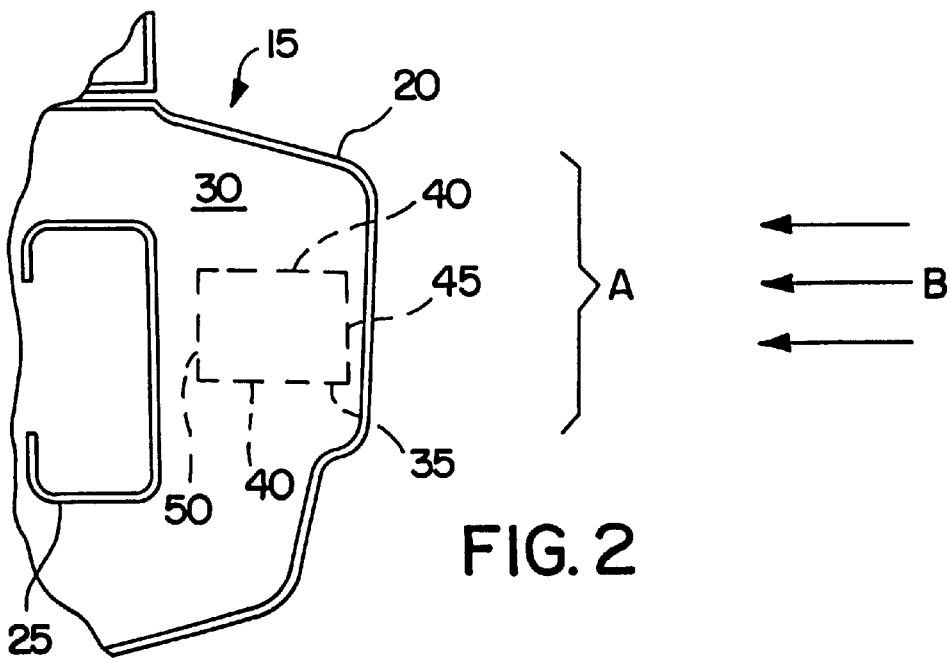
FIG. 2 is a cross-section of the vehicular bumper illustrated in FIG. 1.

With reference to FIGS. 1 and 2, there is illustrated a vehicle 10 comprising a bumper 15 having an impact surface designated A. Bumper 15 comprises fascia 20 and steel beam 25. Steel beam 25 is affixed to vehicle 10 by any suitable means (not shown). Disposed within bumper 15 and covered by fascia 20 is a substrate body 30 and an insert sheet 35 (for clarity, the permeability of insert sheet 35 is not illustrated). As illustrated, insert sheet 35 is rolled to form a cylinder comprising a continuous wall 40, a leading edge 45 and a trailing edge 50. The interior of the cylinder may be hollow (i.e., unfilled) or filled with foam, elastomer or other material to customize the energy management properties of bumper 15. As illustrated, wall 40 is substantially transverse to impact surface A. In the illustrated embodiment, leading edge 45 of insert sheet 35 is substantially parallel to impact surface A. Although not illustrated, those of skill in the art will recognize that insert sheet 35 can be dimensioned such that leading edge 45 is adjacent or juxtaposed to facia 20 and/or trailing edge 50 is adjacent or juxtaposed to steal beam 25.

When impact surface A of bumper 15 is impacted in the direction of arrows B, the impact forces are received, inter alia, on leading edge 45 of insert sheet 35. The disposition of insert sheet 35 such that the impact forces are received by leading edge 45 results in significantly improved load bearing properties in bumper 15. This is especially the case where substrate body 30 is a polyurethane foam which has densified adjacent the surface of continuous wall 40.

Figure 3:
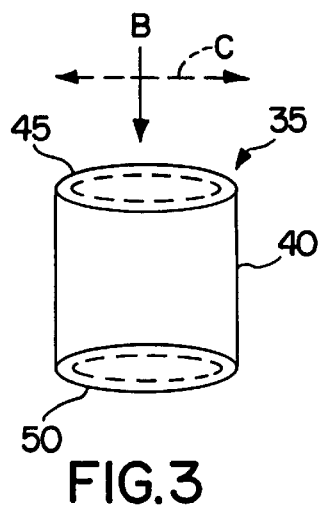
FIGS. 3–7c are perspective views of various embodiments of an permeable insert sheet useful in the present energy management device.

With reference to FIGS. 3–7, there is illustrated various embodiments of an insert sheet suitable for use in the present energy management device (for clarity, the permeability of each insert sheet is not illustrated). For ease of understanding, insert sheet 35 from FIGS. 1 and 2 has been reproduced in FIG. 3. In FIGS. 3–7, the direction of arrow B depicts the direction of impact (i.e., relative to the orientation of the insert sheet(s)) and double-arrowed line C depicts the longitudinal axis of the bumper (or other energy management device). In FIGS. 4–7, the first number in each reference numeral is the Figure number and the last two numbers in each reference numeral corresponds to the like element in FIGS. 1–3. In FIG. 3 the dashed line depicts a tube with ellipsoidal cross-section.

Figure 4:
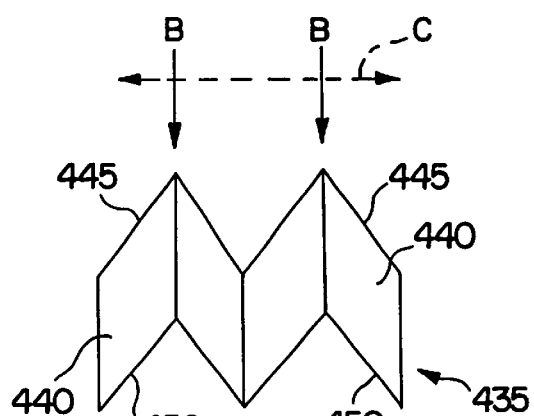

Thus, in FIG. 4, there is illustrated an insert sheet 435 having a zig-zag pattern about the longitudinal axis of the bumper. Insert sheet 435 comprises a series of walls 440. Each wall 440 defines a leading edge 445 and a trailing edge 450.

Figure 5:
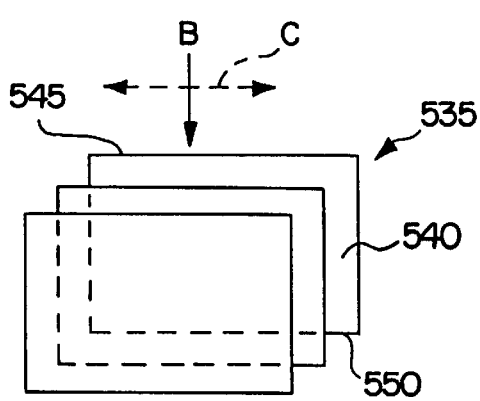

In FIG. 5, there is illustrated a trio of insert sheets 535. Each sheet 535 comprises a wall 540 which defines a leading edge 545 and a trailing edge 550. In the illustrated embodiment, the trio of insert sheets 535 are parallel to one another. Further, the trio of insert sheets 535 are disposed substantially parallel to the longitudinal axis of the bumper.

Figure 6:
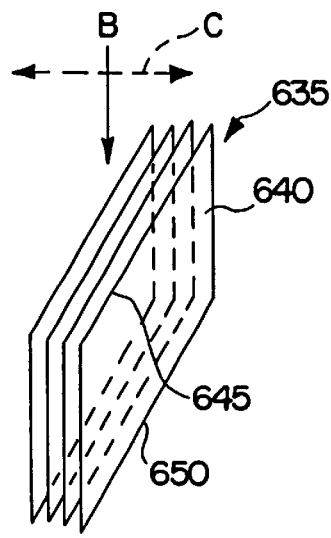

In FIG. 6, there is illustrated a quartet of insert sheets 635. Each sheet 635 comprises a wall 640 which defines a leading edge 645 and a trailing edge 650. In the illustrated embodiment, the quartet of insert sheets 635 are parallel to one another. Further, the quartet of insert sheets 635 are disposed substantially orthogonal to the longitudinal axis of the bumper.

Figure 7A:
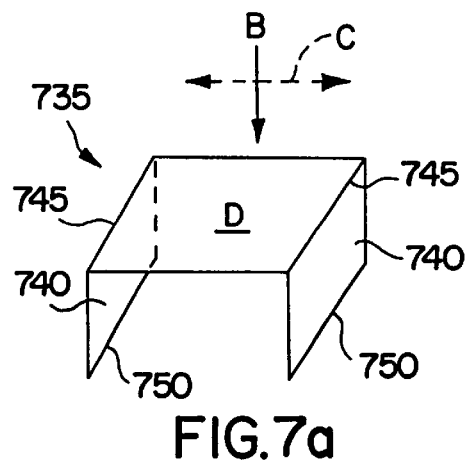
Figure 7B:
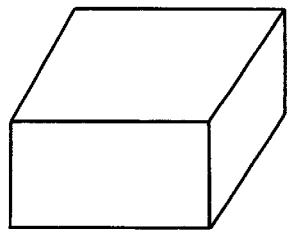
Figure 7C:
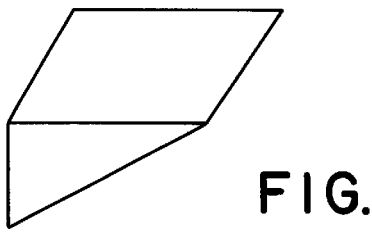

In FIG. 7, there is illustrated an insert sheet 735 defined by a pair of walls 740 which are interconnected by a wall D. Each wall 740 comprises a leading edge 745 and a trailing edge 750. In the illustrated embodiment, pair of walls 740 are parallel to one another. Further, wall D is disposed substantially parallel to longitudinal axis and adjacent to the impact surface of the bumper. A particular advantage of insert sheet 735 is that it allows for the possibility of using a material within walls 740 which is different from the material used without walls 740. For example, if the substrate body is made of polyurethane foam, it is possible to use foams which differ with respect to one or more of density, cell structure, energy management properties and the like. Since the shape of insert sheet 735 additionally serves to provide a convenient divider, the production of such a "dual material" substrate body is facilitated since the inert sheet is to remain therein. The dashed lines in FIG. 7 depict inserts of rectangular and triangular cross-section, respectively.

While FIGS. 3–7 illustrate various specific embodiments of an insert sheet useful in the present energy management device, the common feature of each sheet is a wall which is oriented transverse to a plane which receives an impact (i.e., in the direction of arrows B in FIGS. 3–7). In this manner, at least a portion of the impact load is received on the leading edge of the insert sheet thereby improving the energy management properties of the bumper. Of course, those of skill in the art will immediately recognize that it possible to modify the specific embodiments illustrated in FIGS. 3–7 without departing from the functional scope thereof For example, it is possible to modify the embodiment in FIG. 4 such that wall 440 is continuous and curved to define a continuous leading 445 which undulates about the longitudinal axis of the bumper. Other variations will be immediately apparent to those of skill in the art.

Figure 8:
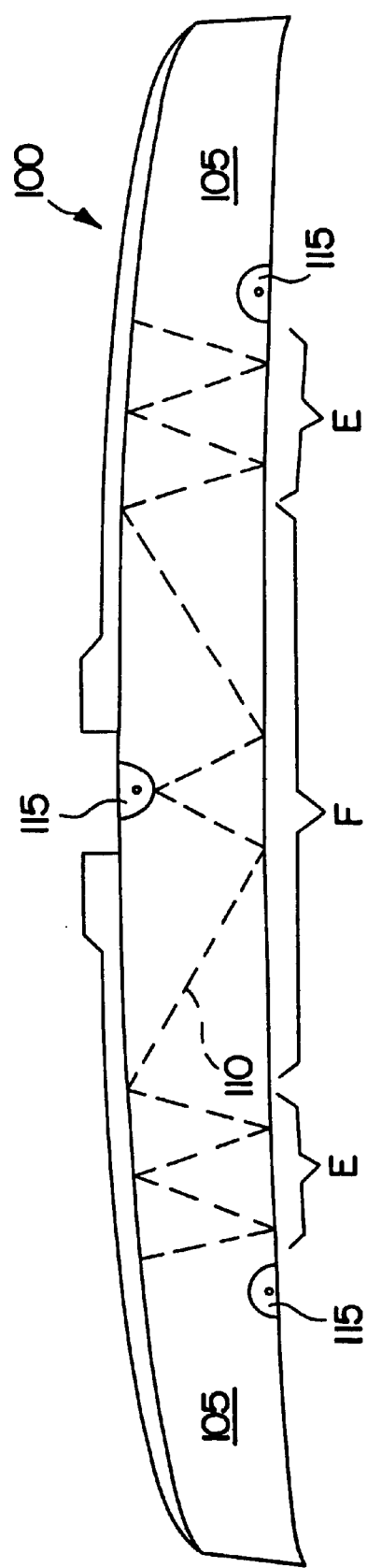
FIG. 8 is a front elevation, partially cut away, of another preferred vehicular bumper within the scope of the present energy management device.

With reference to FIG. 8, there is illustrated a front elevation, partially cut away, of a preferred energy management device in the form of a bumper 100. Bumper 100 comprises a substrate body 105 in which there is embedded a series of mounting brackets 115. Also embedded in substrate body 105 is an insert sheet generally similar the one illustrated in FIG. 4, which has been to have distinct regions E and F defined by the pattern of the leading edge of insert sheet 110. This orientation and pattern of insert sheet 110 has been found to be particularly advantageous.

While the specific embodiments described hereinabove have been with respect to a vehicular bumper, those of skill in the art will immediately recognize many other automotive and non-automotive applications for the present energy management device. Non-limiting examples of useful other automotive applications include: side-impact panels, head-impact pillars, reinforced pillar support structures for roof crush, reinforced frame rails for crush zone protection and the like.

Embodiments of the invention will be illustrated with reference to the following Examples which should not be used to limit the scope of the invention. In the Examples, all parts are parts by weight, unless otherwise indicated.

In the Examples, the following materials were used:

Substrate body: a polyurethane foam produced from a formulation similar to Bayer EA-60™ (a formulation kit for producing an energy management polyurethane foam commercially available from Bayer Inc.); and Nico ¾ oz. fiberglass mat: fiberglass mat commercially available from Nico Fibers Incorporated.

EXAMPLES 1–3

In these Examples, a foam sample was produced in a mold dimensioned to produce a product having the following dimensions: 10"×5"×4".

The fiberglass mat (if used) was placed to provide a leading edge pattern similar to the illustrated in FIG. 8 discussed hereinabove (i.e., the fiberglass mat was disposed in a manner to provide a zig-zag pattern about a longitudinal axis of the part). The foam formulation was then dispensed into the mold and the mold was closed to allow the formulation to expand to fill the mold and cure. The foam sample was then demolded for physical testing. In each case, the foam had a density of 10 pounds per cubic foot.

Each foam sample was subjected to the 5 mph HI-20 Pendulum Impact test (3800 vehicle mass on a rigid steel beam) pursuant to 49 C.F.R. Part 581, including the Preamble to Part 581 (Pre 1–56, inclusive) referred to hereinabove. In the test, the foam sample was oriented so that the wall of the fiberglass insert was transverse to the surface of the foam sample being impacted (in other words, the leading edge of the fiberglass insert received the impact).

The energy absorbing efficiency (or "efficiency") of each foam sample was also evaluated. As is known in the art, efficiency is calculated from a stress-strain curve which is a plot of compressive force (in this case the data for the plot was obtain during the Pendulum Impact Test discussed above) versus relative penetration depth of the foam (also known as deflection or stroke). Generally, the flatter the stress-strain curve, the higher the efficiency of the foam. A foam having an efficiency of 100% (this foam is theoretical) would have a characteristic stress-strain "curve" in the shape of a box whose boundries, for a given impact speed or velocity, are defined by the maximum compressive force from zero to maximum relative penetration. The efficiency of a particular foam is determined by assessing the area under the stress-strain curve as a fraction of the area under the stress-strain "curve" for a foam having an efficiency of 100% as follows:

$$\frac{\text{Area under curve for specific foam}}{\text{Area under curve for 100\% efficiency foam}} \times 100\%$$

The results are provided in Table 1. As is evident from Table 1, an insert sheet was not used in Example 1 and thus, this Example is outside the scope of the present invention and is provided for comparative purposes only.

In Table 1, the length of the leading edge of the insert is provided and is an indication of the size of the insert sheet embedded in the substrate body. Further, the maximum stroke is a measurement of the overall penetration into the foam sample of the impact pendulum.

The results in Table 1 illustrate the significant increase in dynamic compressive strength of the foam samples (i.e., the ability of the foam samples to absorb the load of an impact) of Examples 2 and 3 (insert sheet used) compared to that of the foam sample of Example 1 (no insert sheet used). Further, the results in Table 1 illustrate a significant reduction in the maximum stroke observed for the foam samples of Examples 2 and 3 (insert sheet used) compared to that of the foam sample of Example 1 (no insert sheet used). The foam sample of Example 3 in particular was dramatic in that the entire load of impact was absorbed by the foam sample prior to 50% deflection (i.e., maximum stroke of 1.73 in. whereas 50% deflection would have occurred at 2 in.). Still further, the results in Table 1 illustrate a significant increase in the energy absorbing efficiency observed for the foam samples of Examples 2 and 3 (insert sheet used) compared to that of the foam sample of Example 1 (no insert sheet used).

EXAMPLES 4–7

In these Examples, a foam sample was produced in a mold dimensioned to produce a product having the following dimensions: 3"×3"×2".

The fiberglass mat, if used was placed to provide a leading edge pattern as described generally hereinabove (i.e., the fiberglass mat was disposed in a manner to provide a zig-zag pattern about a longitudinal axis of the part). Specifically, in Example 5, the insert was a single sheet disposed as illustrated in FIG. 6. In Example 6, the insert was a sheet with a leading edge having a V-shape. In Example 7, the insert sheet was disposed as illustrated in FIG. 4. The foam formulation was then dispensed into the mold and the mold was closed to allow the formulation to expand to fill the mold and cure. The foam sample was then demolded for physical testing. In each case the foam had a density of 4 pounds per cubic foot.

Each foam sample was subjected to a static compressive strength test pursuant to ASTM D1621. In the test, the foam sample was oriented so that the wall of the fiberglass insert was transverse to the surface of the foam sample being compressed (in other words, the leading edge of the fiberglass insert received the compression). The results are provided in Table 2. As is evident from Table 2, an insert sheet was not used in Example 4 and thus, this Example is outside the scope of the present invention and is provided for comparative purposes only.

In Table 2, the length of the leading edge of the insert is provided and is an indication of the size of the insert sheet embedded in the substrate body.

The results in Table 2 illustrate the significant increase in the static compressive strength of the foam samples (i.e., the ability of the foam samples to absorb the load of static compression) of Examples 5–7 (insert sheet used) compared to that of the foam sample of example 4 (no insert sheet used).

As described in the originally-filed claims, the energy management device may comprise a tube with a substantially circular cross-section. Alternatively, the energy management device may comprise a tube of substantially rectilinear cross-section. As another alternative, the energy management device may comprise a tube having a substantially triangular cross-section. Likewise, the energy management device may comprise a tube having a substantially rectangular cross-section. The energy management device may also comprise a pair of interconnected substantially parallel permeable insert sheets. The insert sheets may be disposed substantially parallel to a longitudinal axis of the energy management device. On the other hand, the insert sheets may be disposed substantially transverse to a longitudinal axis of the energy management device.

TABLE 1

| Example | Insert Used (Y/N) | Length of Leading Edge of Insert (in.) | Efficiency (%) | Maximum Stroke (in.) | Dynamic Compressive Strength (kPa) 10% Deflection | 30% Deflection | 50% Deflection |
|---|---|---|---|---|---|---|---|
| 1 | N | n/a | 54.5 | 3.05 | 2042 | 2628 | 2963 |
| 2 | Y | 77 | 63.7 | 2.15 | 3230 | 4344 | 4186 |
| 3 | Y | 160 | 66.4 | 1.73 | 4328 | 5094 | n/a |

TABLE 2

| Example | Insert Used (Y/N) | Length of Leading Edge of Insert (in.) | Static Compressive Strength (kPa) 10% Deflection | 30% Deflection | 50% Deflection |
|---|---|---|---|---|---|
| 4 | N | n/a | 177.2 | 250.4 | 318.6 |
| 5 | Y | 2.5 | 231.2 | 322.9 | 418.8 |
| 6 | Y | 5.0 | 272.2 | 343.4 | 406.2 |
| 7 | Y | 7.5 | 321.2 | 368.6 | 425.7 |

What is claimed is:

1. An energy management device having an energy absorbing surface, the energy management device comprising:
   a polymeric foam substrate body; and
   at least one permeable insert sheet disposed in the substrate body, the at least one permeable insert sheet having a wall substantially orthogonal to the energy absorbing surface, the at least one permeable insert sheet having a porous surface which has sheet permeability with voids sized so that a liquid polymeric foam ingresses into and locks with said at least one permeable insert sheet to cause substantially uniform densification of the polymeric foam substrate body across the porous surface of the insert sheet.

2. The energy management device defined in claim 1, wherein the substrate body comprises a non-foam material.

3. The energy management device defined in claim 2, wherein the non-foam material comprises an elastomer.

4. The energy management device defined in claim 2, wherein the non-foam material comprises an isocyanate-based elastomer.

5. The energy management device defined in claim 2, wherein the non-foam material comprises a polyurethane elastomer.

6. The energy management device defined in claim 1, the substrate body comprises a foam material.

7. The energy management device defined in claim 6, wherein the foam material comprises expanded polypropylene foam.

8. The energy management device defined in claim 6, wherein the foam material comprises a foamed isocyanate-based polymer.

9. The energy management device defined in claim 6, wherein the foam material comprises a polyurethane foam.

10. The energy management device defined in claim 6, wherein the foam material has an indentation force deflection at 25% deflection in the range of from about 150 to about 40000 pounds when measured pursuant to ASTM 3574-$B_1$.

11. The energy management device defined in claim 6, wherein the foam material has an indentation force deflection at 25% deflection in the range of from about 1000 to about 25000 pounds when measured pursuant to ASTM 3574-$B_1$.

12. The energy management device defined in claim 6, wherein the foam material has an indentation force deflection at 25% deflection in the range of from about 2500 to about 10000 pounds when measured pursuant to ASTM 3574-$B_1$.

13. The energy management device defined in claim 6, wherein the foam material penetrates the at least one permeable insert sheet to define an area having relatively high density compared to the remainder of the foam material in the substrate body.

14. The energy management device defined in claim 1, wherein the at least one permeable insert sheet comprises a fibrous sheet.

15. The energy management device defined in claim 14, the fibrous sheet comprises at least one member selected from the group consisting of fibrous mats, fibrous cloths and composites thereof.

16. The energy management device defined in claim 14, wherein the fibrous sheet comprises at least one member selected from the group consisting of chopped glass fibres, unchopped glass fibres and mixtures thereof.

17. The energy management device defined in claim 1, wherein the fibrous sheet comprises at least one member selected from the group consisting of polyester fibres, polyolefin fibres, Kevlar fibres, polyamides fibres, cellulose fibres, carbon fibres, spun bound polyesters, paper and mixtures thereof.

18. The energy management device defined in claim 1, wherein the at least one permeable insert sheet comprises a non-fibrous sheet.

19. The energy management device defined in claim 18, wherein the non-fibrous sheet comprises at least one member selected from the group consisting of a thermoset, a metal, a polycarbonate, a polycarbonate/ABS alloy, an ABS terpolymers, polyester terphthalate, vinyl, styrene maleic anhydride, fibreglass reinforced polypropylene and mixtures thereof.

20. The energy management device defined in claim 19, wherein the thermoset is selected from the group consisting of polyurethane, polyester, epoxy and mixtures thereof.

21. The energy management device defined in claim 19, wherein the metal comprises aluminum foil.

22. The energy management device defined in claim 1, wherein at least one permeable insert sheet is disposed as a tube in the substrate body.

23. The energy management device defined in claim 22, wherein the tube comprises a curved cross-section.

24. The energy management device defined in claim 22, wherein the tube comprises a substantially circular cross-section.

25. The energy management device defined in claim 22, wherein the tube comprises a substantially ellipsoidal cross-section.

26. The energy management device defined in claim 22, wherein the tube comprises a substantially rectilinear cross-section.

27. The energy management device defined in claim 22, wherein the tube comprises a substantially triangular cross-section.

28. The energy management device defined in claim 22, wherein the tube comprises a substantially rectangular cross-section.

29. The energy management device defined in claim 1, wherein the at least one permeable insert sheet comprises an edge substantially parallel to the energy absorbing surface.

30. The energy management device defined in claim 29, wherein the edge follows a substantially undulating pattern.

31. The energy management device defined in claim 29, wherein the edge follows a substantially zig-zag pattern.

32. The energy management device defined in claim 1, comprising a plurality of substantially parallel permeable insert sheets.

33. The energy management device defined in claim 32, wherein the plurality of insert sheets are disposed substantially parallel to a longitudinal axis of the energy management device.

34. The energy management device defined in claim 32, wherein the plurality of insert sheets are disposed substantially transverse to a longitudinal axis of the energy management device.

35. The energy management device defined in claim 1, comprising a pair of interconnected substantially parallel permeable insert sheets.

36. The energy management device defined in claim 35, wherein the insert sheets are disposed substantially parallel to a longitudinal axis of the energy management device.

37. The energy management device defined in claim 35, wherein the insert sheets are disposed substantially transverse to a longitudinal axis of the energy management device.

38. A force absorbing device, comprising:

a surface disposed orthogonal to an applied force;

a polymer substrate disposed below said surface; and a fibrous insert bonded to said substrate, said fibrous insert having a porous surface which is permeable and has voids to permit ingress of a liquid polymeric foam into said fibrous insert, said substrate being substantially uniformly densified across the porous surface of the insert, wherein said fibrous insert comprises a planar sheet disposed in a zig-zag pattern when viewed from the direction of the applied force.

39. A device according to claim 38, wherein said substrate surrounds said insert.

40. A force absorbing device, comprising:

a surface disposed orthogonal to an applied force;

a polymer substrate disposed below said surface; and a fibrous insert bonded to said substrate, said fibrous insert having a porous surface which is permeable to permit ingress of said substrate into said fibrous insert, said substrate being substantially uniformly densified across the porous surface of the insert, wherein said insert comprises a planar sheet disposed in a zig-zag pattern when viewed from the direction of the applied force.

41. A vehicle bumper, comprising:

a bumper outer surface;

a polymeric foam substrate disposed inside of said bumper outer surface; and a fibrous insert disposed inside said polymeric foam substrate, said insert comprising a planar sheet material having a leading edge disposed in a zig-zag pattern when viewed from a direction orthogonal to said bumper outer surface, said zig-zag pattern having two different pattern regions, said polymeric foam substrate penetrating voids in said fibrous insert.

* * * * *